United States Patent [19]
Danno et al.

[11] Patent Number: 5,398,503
[45] Date of Patent: Mar. 21, 1995

[54] ENGINE EXHAUST EMISSION CONTROL SYSTEM

[75] Inventors: Yoshiaki Danno, Kyoto; Kazuo Koga; Takashi Dougahara, both of Okazaki, all of Japan

[73] Assignee: Mitsubishi Jidosha Kogyo Kabushiki Kaisha, Tokyo, Japan

[21] Appl. No.: 109,511

[22] Filed: Aug. 20, 1993

[30] Foreign Application Priority Data

Aug. 24, 1992 [JP] Japan ................. 4-223997
Aug. 24, 1992 [JP] Japan ................. 4-223998

[51] Int. Cl.6 ............................................. F01N 3/20
[52] U.S. Cl. ............................... 60/288; 60/297; 60/311
[58] Field of Search .................. 60/287, 288, 297, 311; 123/686

[56] References Cited

U.S. PATENT DOCUMENTS

| | | | |
|---|---|---|---|
| 4,485,621 | 12/1984 | Wong | 60/274 |
| 4,974,414 | 12/1990 | Kono | 60/286 |
| 5,051,244 | 9/1991 | Dunne | 423/212 |
| 5,067,318 | 11/1991 | Arai | 60/288 |
| 5,090,200 | 2/1992 | Arai | 60/286 |
| 5,125,231 | 6/1992 | Patil | 60/274 |
| 5,140,811 | 8/1992 | Minami | 60/297 |
| 5,195,318 | 3/1993 | Shinzawa | 60/285 |

FOREIGN PATENT DOCUMENTS 0424966 5/1991 European Pat. Off. .

OTHER PUBLICATIONS

SAE Technical Paper Series No. 920847, The Engineering Society for Advancing Mobility Land Sea Air and Space, International Congress & Exposition, Detroit, Mich., Feb. 24–28, 1992, *Cold-Start Hydrocarbon Collection for Advanced Exhaust Emission Control*, by Martin J. Heimrich and Lawrence R. Smith.

*Primary Examiner*—Ira S. Lazarus
*Assistant Examiner*—Daniel J. O'Connor

[57] ABSTRACT

An engine exhaust emission control system, in which a valve is set at a hydrocarbon adsorbing position to guide exhaust emissions to a bypass line including an adsorbent sieve for adsorbing hydrocarbons during a initial period of engine start-up, and the valve is switched over to a hydrocarbon purging position to guide exhaust emissions to an exhaust line and to divert a part of the exhaust emissions to the bypass line.

18 Claims, 4 Drawing Sheets

ENGINE EXHAUST EMISSION CONTROL SYSTEM

BACKGROUND OF THE INVENTION

1. Field of the Invention

This invention relates to an engine exhaust emission control system designed to reduce noxious substances from exhaust emissions.

2. Description of the Related Art

Catalytic converter systems are generally used to control exhaust emissions from an automotive engine operating with an air fuel mixture having the stoichiometric ratio. During the engine start-up period, fuel is not, however, effectively mixed with air, and too much fuel tends to be supplied so that the air-fuel mixture is rich. Therefore, raw hydrocarbons are introduced into the atmosphere before the catalytic converter systems reach their effective temperature during engine start-up.

There have been numerous suggestions for avoiding the foregoing problem. For example, it has been proposed to dispose in the exhaust system adsorbents such as active carbon and zeolite so as to adsorb hydrocarbons. European patent application EP 424,966 A exemplifies an exhaust gas control device, which comprises a catalytic converter, an adsorbent sieve adsorptive of hydrocarbons and located upstream of a catalytic converter, a bypass passing through the adsorbent sieve, and a change-over valve, thereby adsorbing, desorbing and oxidizing hydrocarbons. U.S. Pat. No. 5,125,231 suggests an engine exhaust system to reduce hydrocarbon emissions, which comprises a first catalytic converter, an adsorbent sieve adsorptive of hydrocarbon and a second catalytic converter both of which are located downstream of the first catalytic converter, a bypass line detouring the adsorbent sieve and the second catalytic converter, and a recycle line for connecting an exhaust line upstream of the first converter and the exhaust line downstream of the second converter, thereby adsorbing, desorbing and oxidizing hydrocarbons. Further, SAE TECHNICAL PAPER SERIES 920847 describes an exhaust emission control system, which comprises a catalytic converter, an adsorbent sieve located downstream of the catalytic converter, an adsorbent bypass, an exhaust line between an intake pipe and an exhaust pipe, three valves and an air pump so that hydrocarbons are adsorbed, desorbed and oxidized.

Unfortunately, such conventional devices suffer from problems that adsorbed hydrocarbons sometimes desorb from the adsorbent sieve before the catalytic converters reach their effective temperature, or that a very complicated control mechanism is required for operating a plurality of valves and the air pump.

SUMMARY OF THE INVENTION

It is therefore an object of the present invention to provide an engine exhaust emission control system which can reduce hydrocarbons during the engine start-up period and which is simple in structure and durable.

In a first aspect of the invention, exhaust emissions are directed to an adsorbent sieve via a bypass line during the engine start-up period. Then, high-temperature exhaust emissions are introduced to a catalytic converter via an exhaust line, and a part of such exhaust emissions are diverted to the bypass line after the catalytic converter reaches its effective temperature. Specifically, during the initial period of engine start-up, cold exhaust emissions are directed to the bypass line so that the adsorbent sieve adsorbs hydrocarbons therefrom. On reaching its active temperature, the catalytic converter can convert hot exhaust emissions to non-toxic substances. When this occurs, a part of the hot exhaust emission having few hydrocarbons is diverted to the bypass line so as to purge adsorbed hydrocarbons from the adsorbent sieve, and is then directed to the catalytic converter so as to be further purified therein.

In a second aspect of the invention, the exhaust emission control system includes a catalytic converter and an adsorbent sieve which is adsorptive of hydrocarbons and is situated downstream of the catalytic converter. Specifically, the catalytic converter is heated by exhaust emissions prior to the adsorbent sieve. Therefore, the catalytic converter reaches its effective temperature before the adsorbent sieve becomes too hot to adsorb hydrocarbons. Thus, hydrocarbons can be oxidized efficiently.

DETAILED DESCRIPTION OF THE PREFERRED EMBODIMENTS

Figure 1:
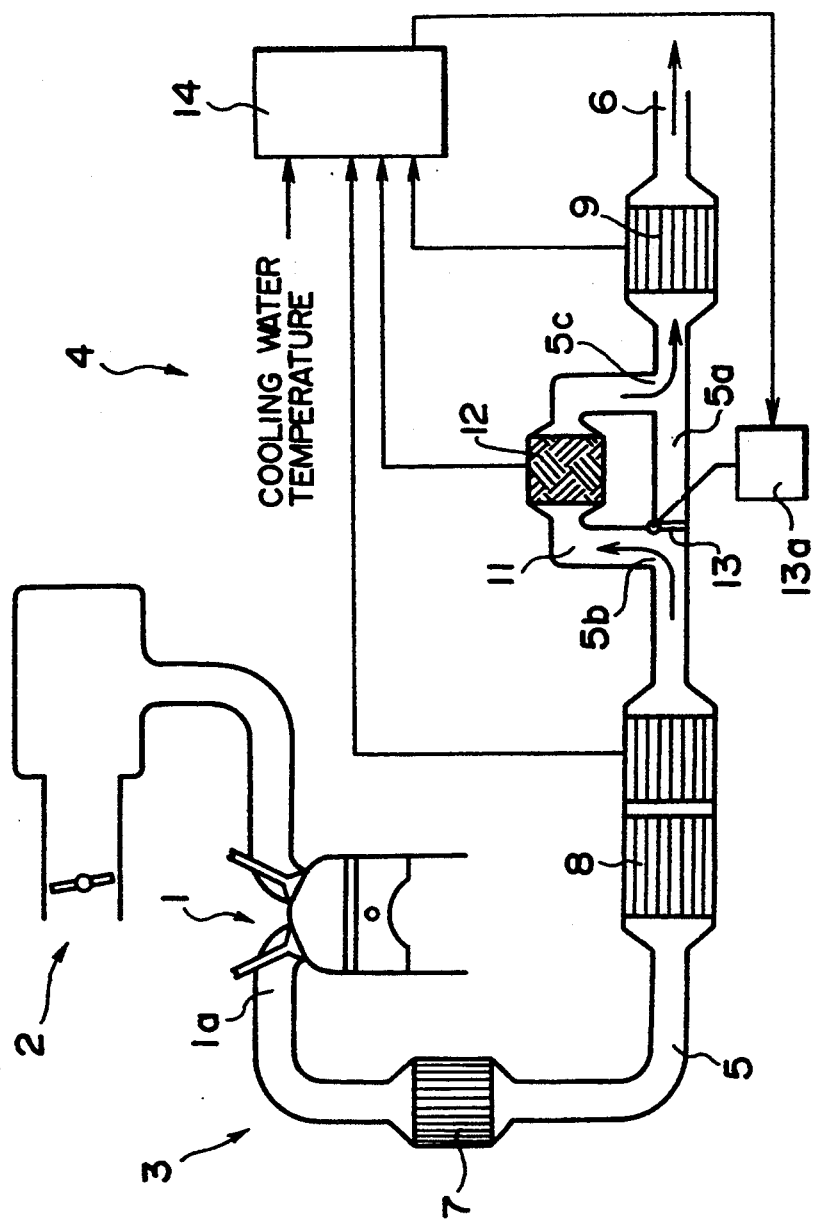
FIG. 1 is a schematic drawing of an engine exhaust emission control system according to a first embodiment of the invention, showing that a valve is at a hydrocarbon adsorbing position.

An engine exhaust emission control system will be described with reference to a first embodiment of the invention shown in FIGS. 1 and 2. Referring to FIG. 1, the engine exhaust emission control system 4 is located in an exhaust system 3 of a gasoline engine 1. In FIG. 1, reference numeral 2 denotes an intake system.

Exhaust emissions from the engine 1 flow via an exhaust port 1a, an exhaust line 5, an exhaust outlet 6 and a muffler, not shown, to be finally discharged into the atmosphere. In the exhaust line 5, there are disposed a well-known warm-up converter 7, a first catalytic converter 8 and a second catalytic converter 9 in this order. The first and second catalytic converters 8 and 9 contain a well-known three-way catalyst or an oxidation catalyst.

The engine exhaust emission control system 4 comprises the second catalytic converter 9, a bypass line 11 which is located upstream in the exhaust line 5 from the second catalytic converter 9 and branches from and merges into the exhaust line 5a at positions 5b and 5c, respectively, an adsorbent sieve 12 adsorptive of hydrocarbons, a valve 13 which is located at the position where the bypass line 11 branches from the exhaust line 5a and is operative to selectively direct exhaust emissions to either the bypass 11 or the exhaust line 5a, and a control unit 14 for selecting the positions of the valve 13. The valve 13 is selectively operated to the foregoing positions by an actuator 13a.

The control unit 14 is mainly a microcomputer which controls the operation of the actuator 13a. The control unit 14 receives signals representing temperatures of the first and second converters 8 and 9, adsorbent sieve 12, and engine (e.g. a temperature of the cooling water). These signals are used to control the operation of the valve 13.

The adsorbent sieve 12 contains powder or granular active carbon housed in a canister or adsorbent layers applied in a honeycomb. The configuration and arrangement of the adsorbent sieve 12 depend upon quantities and shapes of the catalytic converters in the exhaust system 5, and the muffler.

The valve 13 is at the hydrocarbon adsorbing position (called "adsorbing position" hereinafter) shown in FIG. 1 so as to guide exhaust emissions to the adsorbent sieve 12 until the engine completes its start-up. Then, when engine start-up is completed, the valve 13 is switched to the hydrocarbon purging position (called "purging position") shown in FIG. 2 so that high-temperature exhaust emissions flow directly to the second converter 9. The operating positions of the valve 13 are controlled in response to signals input to the control unit 14. The valve 13 at the adsorbing position (FIG. 1) completely shuts off the exhaust line 5a so as to guide exhaust emissions to the bypass line 11.

When the valve 13 is at the purging position, it mostly blocks the bypass line 11 but diverts a part of the exhaust emissions to the bypass line 11. For this purpose, it is conceivable to form a recess in a valve sheet at the entrance of the bypass 11. An optimum quantity of exhaust emissions to be diverted depends upon the properties and a suspending structure of the adsorbent materials in the adsorbent sieve 12.

In operation, when the engine 1 is ignited, relatively cold exhaust emissions are discharged to the exhaust line 5 via the exhaust port 1a. During engine start-up, a rich air-fuel mixture is supplied to the engine 1, so that exhaust emissions contain a lot of raw hydrocarbons.

The control unit 14 receives various signals. For instance, the control unit 14 determines the position of the valve 13 in response to a signal from the second converter 9. Immediately after engine start-up, since the second catalytic converter 9 does not reach its effective temperature, the control unit 14 provides the actuator 13a with a signal to operate the valve 13 to the adsorbing position, and guides exhaust emission to the bypass 11 as shown in FIG. 1.

During engine start-up, hydrocarbons in exhaust emissions are adsorbed and held by the adsorbent sieve 12. Therefore, exhaust emissions substantially free from hydrocarbons reach the exhaust line 5a via the position 5c where the bypass line 11 merges into the exhaust line 5a, and are discharged into the atmosphere. The adsorption of hydrocarbons is continued until the second converter 9 is activated.

By monitoring the temperature of the second converter 9 during engine start-up, the control unit 14 recognizes that the second converter 9 becomes active, which corresponds with the completion of engine start-up. The control unit 14 moves the valve 13 to the purging position shown in FIG. 2. Under this condition, both the converters 8 and 9 are active enough to oxidize hydrocarbons. The first and second catalytic converters 8 and 9 oxidize and purify hydrocarbons, nitrogen oxides, and carbon monoxide in exhaust emissions flowing via the exhaust line 5. The air-fuel mixture from the inlet system 2 has a ratio substantially equal to the stoichiometeric ratio after the competition of engine start-up, so that few raw hydrocarbons will be generated.

Figure 2:
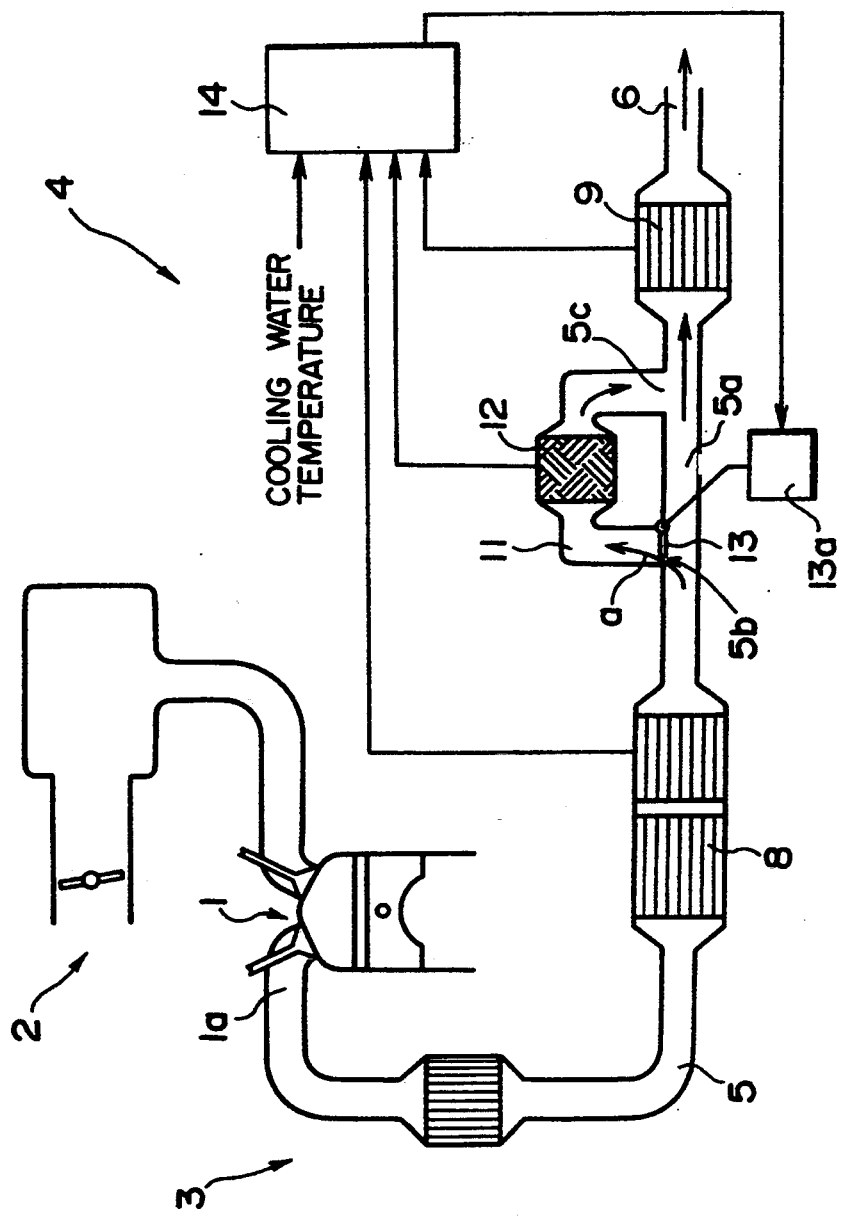
FIG. 2 is a view similar to FIG. 1, showing that the valve is at a hydrocarbon purging position.

The valve 13 at the purging position shown in FIG. 2 diverts a part of the exhaust emissions to the bypass line 11. In other words, a part of the exhaust emissions are introduced into the bypass line 11 because of a difference of pressures at the branching area 5b and the merging area 5c of the bypass line 11 from and into the exhaust line 5a, respectively. Under this condition, exhaust emissions containing few hydrocarbons purge adsorbed hydrocarbons from the adsorbent sieve 12. The purged hydrocarbons are introduced into the exhaust line 5a via the merging area 5c, and are then oxidized by the second catalytic converter 9 so as to be discharged into the atmosphere as less noxious gases.

In this embodiment, the position of the valve 13 is changed when the completion of engine start-up is recognized based on a temperature of the second catalytic converter 9 positioned downstream of the bypass line 11. Alternatively, the completion of engine start-up may be detected based on other signals. For instance, the temperature of engine cooling water may be used for this purpose. When the first catalytic converter 8 is disposed upstream of the bypass line 11, the temperature of the first catalytic converter 8 may be used as a signal for recognizing the completion of engine start-up. Furthermore, the timing for changing the position of the valve 13 may be determined by estimating a timing for detecting the temperature of the adsorbent sieve or the catalytic converter based on a time coefficient of an engine temperature or an engine start-up temperature.

It is also possible to switch the valve 13 to the purging position of FIG. 2 when the adsorbent sieve 12 becomes hot enough to purge hydrocarbons. In this case, since it is possible to shorten the period of time during which the adsorbent sieve 12, which is not resistant to high temperatures, is exposed to hot exhaust emissions, its life expectancy can be lengthened.

In the foregoing embodiment, the adsorbent sieve 12 contains active carbon. Alternatively, zeolite or other materials may be used for the adsorbent sieve. In such a case, since zeolite is not resistant to moisture, the first converter 8 is preferably disposed upstream of the adsorbent sieve so as to remove moisture from exhaust emissions.

A second embodiment of the invention will be described with reference to FIGS. 3 and 4.

Figure 3:
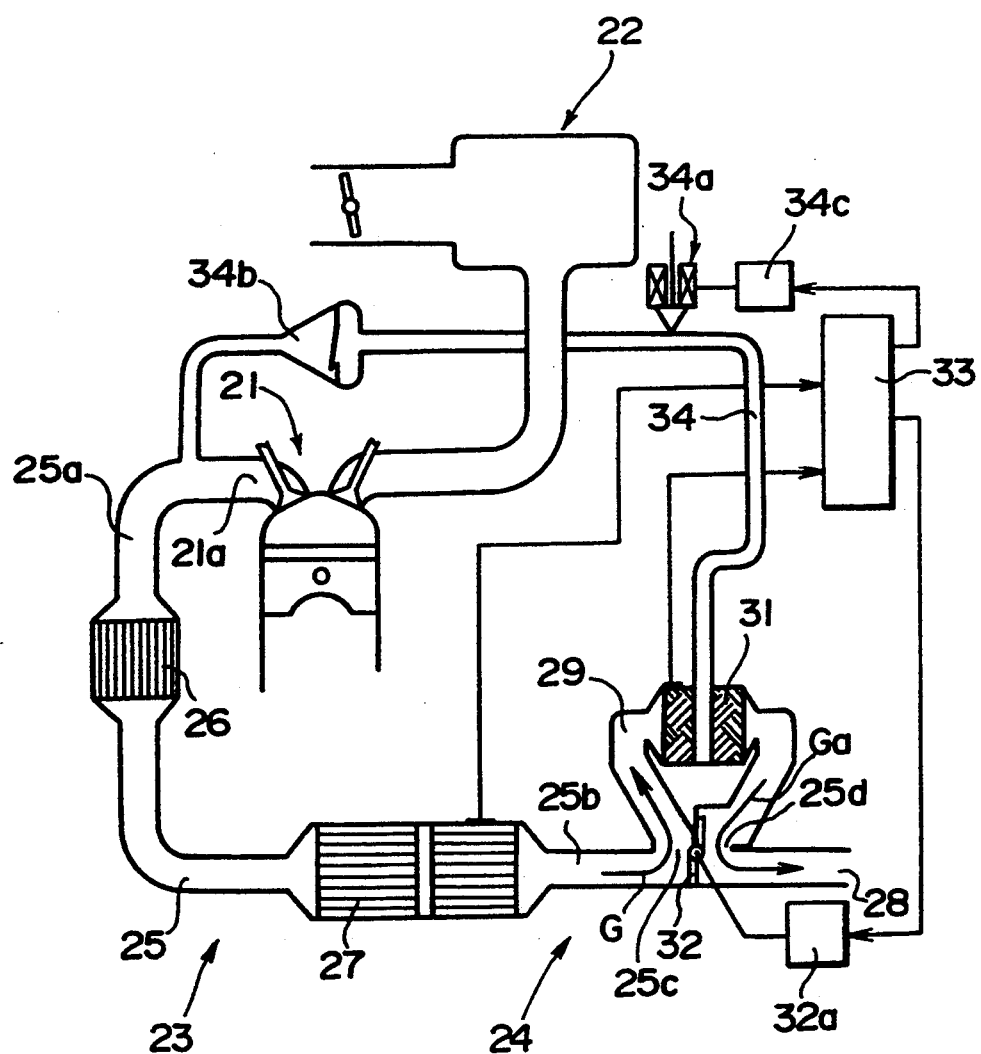
FIG. 3 is a schematic drawing of an engine exhaust emission control system according to a second embodiment of the invention, showing that a valve is at the hydrocarbon adsorbing position.

Referring to FIG. 3, an exhaust emission control system 24 is disposed in an exhaust system 23 of a gasoline engine 21. Reference numeral 22 represents an intake system. The exhaust system 23 comprises an exhaust line 25, first and second catalytic converters 26 and 27 in the exhaust line 25, and a muffler (not shown). The exhaust line. 25 includes an exhaust line 25a extending between an exhaust port 21a of the engine 21 and the first catalytic converter 26, and an exhaust line 25b extending downstream of the second catalytic converter 27.

The engine exhaust stream flows from the exhaust port 21a to the exhaust line 25, an exhaust outlet port 28, the muffler, and is discharged into the atmosphere. The first and second catalytic converters 26 and 27 comprise a well-known three-way or oxidation catalyst.

The exhaust emission control system 24 comprises the second catalytic converter 27, a bypass line 29 branching from the exhaust line 25b, an adsorbent sieve 31 located in the bypass line 29, a valve 32 which is located at a position 25c where the bypass line 29 branches from the exhaust line 25b and conducts exhaust emissions to either the bypass line 29 or the exhaust line 25b, a control means 33 for selecting the position of the valve 32, and a recycle line 34 extending from the adsorbent sieve 31 to the exhaust line 25a.

The valve 32 is selectively switched to one of two positions by an actuator 32 under control of the control means 33. The bypass line 29 branches from the exhaust line 25b at the area 25c and merges into the exhaust line 25b at the area 25d. The actuator 32 is operated by the control means 33 which is mainly a microcomputer.

In the recycle line 34, there are disposed a control valve 34a for shutting off the recycle line 34 and a check valve 34b for controlling the flow of exhaust emission stream, allowing flow in one direction. The check Valve 34b has a well-known structure which prevents exhaust emissions from flowing through the recycle line 34 to the bypass line 29 from the exhaust port 21a, and allows them to flow to the exhaust line 25a from the bypass line 29.

The control means 33 receives signals necessary for controlling the valve, e.g. a signal representing the temperature of the second catalytic converter 27, a signal representing the temperature of the adsorbent sieve 31, and a signal denoting the engine temperature (i.e. a temperature of the cooling water).

The adsorbent sieve 31 includes powder or granular active carbon filled in a canister or adsorbent layers attached in a honeycomb canister. The adsorbent sieve 31 is arranged depending upon the number and shapes of the catalytic converters and mufflers in the exhaust line 25.

Figure 4:
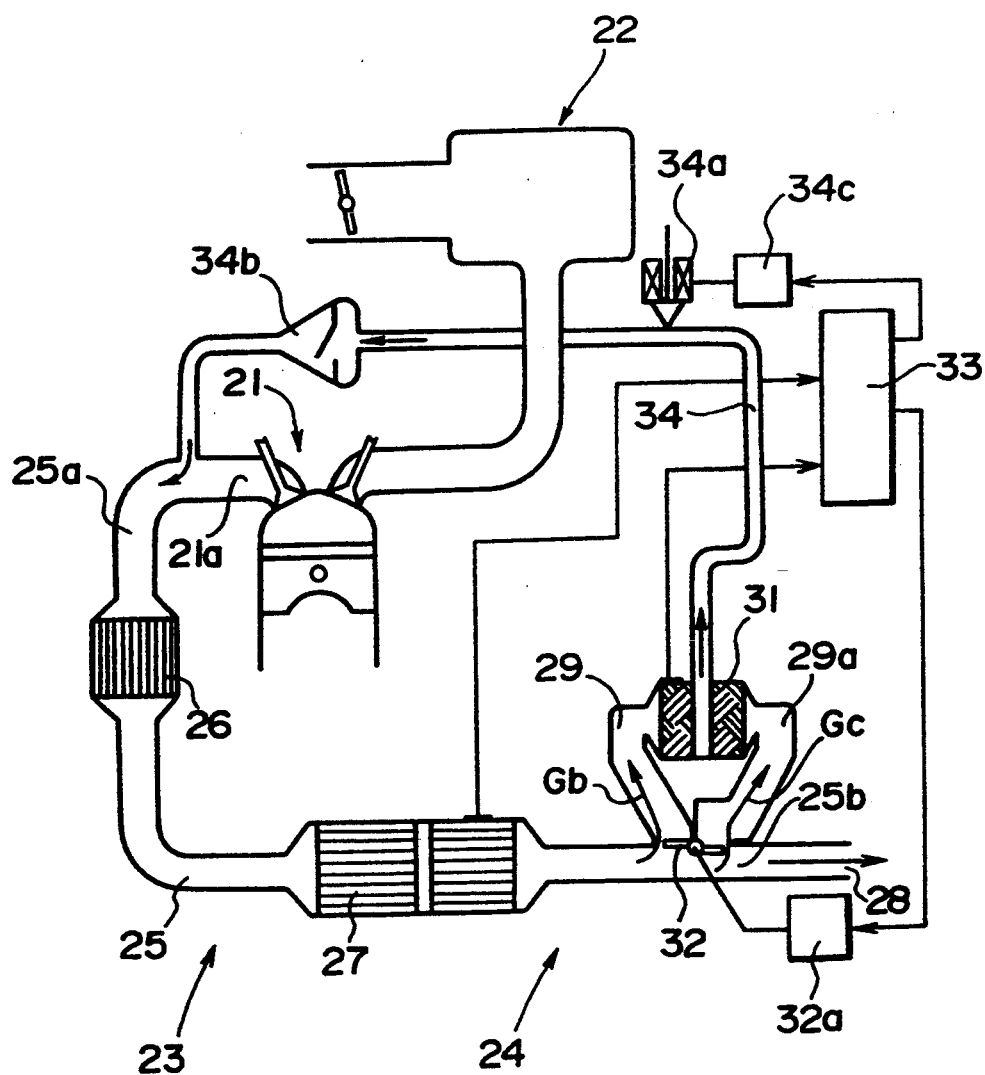
FIG. 4 is a view similar to FIG. 3, showing that the valve is at the hydrocarbon purging position.

The valve 32 is at the adsorbing position shown in FIG. 3 during the period of engine start-up, and is switched to the purging position shown in FIG. 4 after the completion of engine start-up. The control means 33 controls the positions of the valve 32 based on various signals input therein. When in the adsorbing position of FIG. 3, the valve 32 completely shuts off the exhaust line 25b and guides the exhaust emission stream to the bypass line 29.

When in the purging position of FIG. 4, the valve 32 interrupts the bypass line 29 from the exhaust line 25b but diverts a part of the exhaust emission stream to the bypass line 29. For this purpose, it is conceivable to form recesses on valve sheets which are located at the entrance and exit of the bypass line 29. An optimum quantity of exhaust emissions to be diverted depends upon the characteristics and supporting structure of the adsorbent in the adsorbent sieve 31, and the engine type.

The control valve 34a is operated by the control means 33 via a drive circuit 34c. During the hydrocarbon adsorbing mode shown in FIG. 3, the control valve 34a shuts off the recycle line 34. Conversely, during the hydrocarbon purging mode, the valve 34a is at the purging position as shown in FIG. 4 to introduce exhaust emissions to the recycle line 34.

In operation, when the engine 21 is ignited, exhaust emissions are discharged to the exhaust line 25 via the exhaust port 21a. Under this condition, since a fuel-air mixture is rich, exhaust emissions contain raw hydrocarbons in great amounts.

The control unit 33 receives various signals. For instance, the control units 33 determines the position of the valve 32 in response to a signal from the second converter 27. Immediately after engine start-up, since the second catalytic converter 27 does not reach its effective temperature, the control unit 33 provides the actuator 32a with a signal to operate the valve 32 to the adsorbing position, and guides exhaust emission G to the bypass 29 while the exhaust line 25b is shut off. At the same time, the control unit 33 operates the control valve 34a via the drive circuit 34c so as to interrupt the recycle line 34.

During engine start-up, hydrocarbons in exhaust emissions G are adsorbed and held by the adsorbent sieve 31 in the bypass line 29. Therefore, exhaust emissions substantially free from hydrocarbons reach the exhaust line 25b via the area 25c where the bypass line 29 merges into the exhaust line 25b, and are discharged into the atmosphere. The adsorption of hydrocarbons is continued until the second converter 27 is activated.

By monitoring the temperature of the second converter 27 during engine start-up, the control unit 33 recognizes that the second converter 27 becomes active, which corresponds with the completion of engine start-up. The control unit 33 then moves the valve 32 to the purging position (FIG. 4). Under this condition, both the converters 26 and 27 are active enough to oxidize hydrocarbons. The first and second catalytic converters 26 and 27 oxidize and purify hydrocarbons, nitrogen oxides, and carbon monoxide in exhaust emissions flowing via the exhaust line 25. Therefore, purified exhaust emissions are discharged into the atmosphere via the exhaust port 28 in the direction shown by an arrow (FIG. 4). The air-fuel mixture from the inlet system 22 has a ratio substantially equal to the stoichiometric ratio after the competition of engine start-up, so that few raw hydrocarbons will be generated.

The valve 32 at the purging position (FIG. 4) diverts a part of exhaust emissions Gb and Gc to the bypass line 29. In other words, because of pulsation caused by the engine exhaust operation, a part of exhaust emissions Gb and Gb are introduced into the bypass line 29 via the branching area 25c and the merging area 25d. Under this condition, the control valve 34a operates to open the recycle line 34. Exhaust emissions Gb and Gc flowing to the bypass line 29 are returned to the exhaust line 25a via the recycle line 34. Exhaust emissions Gb and Gc have few hydrocarbons, and purge adsorbed hydrocarbons from the adsorbent sieve 31. The purged hydrocarbons flow from the recycle line 34 to the exhaust line 25a, and are oxidized by the first and second catalytic converters 26 and 27 so as to be discharged via the exhaust port 28 into the atmosphere as less noxious gases.

In this embodiment, the position of the valve 32 is changed when the completion of engine start-up is recognized based on the temperature of the second catalytic converter 27 positioned downstream of the bypass line 29. Alternatively, the completion of engine start-up may be detected based on other signals. For instance, the temperature of the engine cooling water may be used for this purpose. When the second catalytic converter 27 is disposed upstream of the bypass line 29, the temperature of the second catalytic converter 27 may be used as a signal for recognizing the completion of engine start-up. Furthermore, the timing for changing the position of the valve 32 may be determined by estimating a timing for detecting the temperature of the adsorbent sieve 31 or the catalytic converter 27 based on a time coefficient of an engine temperature or an engine start-up temperature.

It is also possible to switch the valve 32 to the purging position of FIG. 4 when the adsorbent sieve 31 becomes hot enough to purge hydrocarbons. In this case, since it is possible to shorten the period of time during which the adsorbent sieve 31, which is not resistant to high temperatures, is exposed to hot exhaust emissions, its life expectancy can be lengthened.

In the foregoing embodiment, the adsorbent sieve 31 contains active carbon. Alternatively, zeolite or other materials may be used for the adsorbent sieve. In such a case, since zeolite is not resistant to moisture, it is preferable to dispose the first converter 26 at a position upstream of the adsorbent sieve so as to dry exhaust emissions.

The recycle line 34 terminates at the adsorbent sieve 31 in the foregoing embodiment. Alternatively, the recycle line 34 may be connected to a downstream area 29a of the exhaust line 29 so as to shut off the merging portion 25d by the valve 32.

What is claimed is:

1. An engine exhaust emission control system comprising: an exhaust line; a catalytic converter positioned in the exhaust line for receiving exhaust emissions from an engine; a bypass line extending from the exhaust line at a position upstream of the catalytic converter; an adsorbent sieve adsorptive of hydrocarbons from exhaust emissions and positioned in the bypass line;
    a valve disposed in the exhaust emission line, the valve being selectively operated to a hydrocarbon adsorbing position to direct exhaust emissions to the adsorbent sieve via the bypass line, or to a hydrocarbon purging position to direct exhaust emissions to the catalytic converter via the exhaust line and to divert a part of exhaust emissions to the adsorbent sieve via the bypass; and
    a control means for setting the valve to the hydrocarbon adsorbing position during an initial period of engine start-up, and to the hydrocarbon purging position after the completion of engine start-up.

2. An engine exhaust emission control system as in claim 1, wherein the control means comprises means for determing the expiration of an engine start-up period based on the temperature of the catalytic converter.

3. An engine exhaust emission control system as in claim 1, wherein the control means comprises means for determining the expiration of an engine start-up period based on the temperature of the adsorbent sieve.

4. An engine exhaust emission control system comprising:
    an exhaust line;
    a bypass line branching from the exhaust line;
    a first catalytic converter disposed in the exhaust line at a position upstream of the bypass line;
    a second catalytic converter disposed in the exhaust line downstream of a position where the end of the bypass line merges into the exhaust line;
    an adsorbent sieve adsorptive of hydrocarbons in exhaust emissions and positioned in the exhaust bypass line;
    a valve disposed in the exhaust emission line, the valve being selectively operated to a hydrocarbon adsorbing position to direct exhaust emissions to the adsorbent sieve via the bypass line, or to a hydrocarbon purging position to direct exhaust emissions to the catalytic converter via the exhaust line and to divert a part of exhaust emissions to the adsorbent sieve via the bypass line; and
    a control means for setting the valve to the hydrocarbon adsorbing position during an initial period of engine start-up, and to the hydrocarbon purging position after the completion of engine start-up.

5. An engine exhaust emission control system as in claim 4, wherein the control means comprises means for determining the completion of an engine start-up period based on the temperature of the first catalytic converter.

6. An engine exhaust emission control system as in claim 4, wherein the control means comprises means for determining the completion of an engine start-up period based on the temperature of the second catalytic converter.

7. An engine exhaust emission control system as in claim 4, wherein the control means comprises means for determining the completion of an engine start-up period based on the temperature of the adsorbent sieve.

8. An engine exhaust emission control system comprising:
    an exhaust line;
    a catalytic converter positioned in the exhaust line for receiving exhaust emissions from an engine;
    a bypass line branching from the exhaust emission line at a position downstream of the catalytic converter;
    an adsorbent sieve adsorptive of hydrocarbons in exhaust emissions and positioned in the bypass line;
    a valve disposed in the exhaust line, the valve being selectively operated to a hydrocarbon adsorbing position to direct exhaust emissions to the adsorbent sieve via the exhaust bypass line, or to a hydrocarbon purging position to direct exhaust emissions away from the catalytic converter via the exhaust line and to divert a part of exhaust emissions to the adsorbent sieve via the bypass line;
    a recycle line extending between the adsorbent sieve and the exhaust line upstream of the catalytic converter; and
    a control means for setting the valve to the hydrocarbon adsorbing position during an initial period of engine start-up, and to the hydrocarbon purging position after the completion of engine start-up.

9. An engine exhaust emission control system as in claim 8, wherein the control means comprises means for determining the completion of an engine start-up period based on the temperature of the second catalytic converter.

10. An engine exhaust emission control system as in claim 8, wherein the control means comprises means for determining the completion of an engine start-up period based on the temperature of the adsorbent sieve.

11. An exhaust emission control system comprising:
    an exhaust line;
    a catalytic converter in said exhaust line for receiving exhaust emissions from an engine;
    an additional line communicating with said exhaust line for receiving exhaust from an engine;
    an adsorbent sieve adsorptive of hydrocarbons from exhaust emissions in said additional line;
    a two-position valve selectively operated to a first position to direct all exhaust emissions from an engine to said adsorptive sieve and said catalytic converter or to a second position to direct a portion of the exhaust emissions to said adsorptive sieve and all exhaust emissions to said exhaust line; and
    means for setting said valve in said first or said second position.

12. An engine exhaust emission control system as in claim 11, wherein when said valve is in said .second position, the portion of the exhaust which is directed to said adsorptive sieve is subsequently directed to said catalytic converter.

13. An engine exhaust emission control system as in claim 11, wherein said setting means sets said valve in said first position when a temperature in said system is lower than a predetermined temperature and in said second position when said temperature in said system equals or exceeds said predetermined temperature.

14. An engine exhaust emission control system as in claim 13, wherein said temperature in said system is the temperature of said adsorptive sieve.

15. An engine exhaust emission control system as in claim 11, wherein said first position of said valve is an adsorptive position wherein said adsorptive sieve adsorbs hydrocarbons in the exhaust emissions, and said second position of said valve is a purging position wherein said sieve is purged of hydrocarbons.

16. An engine exhaust emission control system comprising:
    a catalytic converter for receiving exhaust emissions from an engine;
    an adsorptive sieve adsorptive of hydrocarbons from exhaust emissions for receiving exhaust emissions from an engine;
    a two-position valve selectively operated to a first position which directs all exhaust from an engine to said catalytic converter and said adsorptive sieve or to a second position which directs a portion of the exhaust emissions from an engine to said adsorptive sieve and all emissions to said catalytic converter; and
    means for setting said valve in said first or said second position.

17. An engine exhaust emission control system as in claim 16, wherein said setting means sets said valve in said first position when a temperature in said system is lower than a predetermined temperature and sets said valve in said second position when said temperature in said system equals or exceeds said predetermined temperature.

18. An engine exhaust emission control system as in claim 16, wherein when said valve is in said second position, said exhaust which is directed to said adsorptive sieve is subsequently directed to said catalytic converter.

* * * * *